United States Patent
Jainek

(10) Patent No.: US 8,511,481 B2
(45) Date of Patent: Aug. 20, 2013

(54) LIQUID FILTER, IN PARTICULAR AN OIL FILTER

(75) Inventor: Herbert Jainek, Heilbronn (DE)

(73) Assignee: Mann + Hummel GmbH, Ludwigsburg (DE)

( * ) Notice: Subject to any disclaimer, the term of this patent is extended or adjusted under 35 U.S.C. 154(b) by 184 days.

(21) Appl. No.: 12/832,107

(22) Filed: Jul. 8, 2010

(65) Prior Publication Data

US 2011/0005996 A1   Jan. 13, 2011

(30) Foreign Application Priority Data

Jul. 9, 2009  (DE) .................. 10 2009 032 702

(51) Int. Cl.
| | |
|---|---|
| *B01D 27/00* | (2006.01) |
| *B01D 35/00* | (2006.01) |
| *B01D 35/28* | (2006.01) |
| *B01D 27/06* | (2006.01) |
| *B01D 29/00* | (2006.01) |

(52) U.S. Cl.
USPC ........... 210/437; 210/248; 210/435; 210/440; 210/443; 210/457; 210/450; 210/455; 210/493.1

(58) Field of Classification Search
USPC ....................................... 210/248
See application file for complete search history.

(56) References Cited

U.S. PATENT DOCUMENTS

2007/0131607 A1 *  6/2007  Nawa et al. ................. 210/435

FOREIGN PATENT DOCUMENTS
EP    1031367 A1 *  8/2000

* cited by examiner

*Primary Examiner* — Benjamin Kurtz
(74) *Attorney, Agent, or Firm* — James Hasselbeck

(57) ABSTRACT

A liquid filter with a filter housing (9) with a filter element (8, 108, 208) arranged within. Within the filter element (8, 108, 208) a standpipe (3, 103, 203) is arranged. This standpipe is sealing connected with the filter element, whereby in the connecting range between standpipe and filter element a sealing element (15, 115) is arranged for sealably closing a discharge hole (11) in the housing (9). The sealing element (15, 115) seals the discharge hole and also sealably separates a clean side from a contaminated fluid side by sealing between the standpipe and the filter housing.

10 Claims, 3 Drawing Sheets

LIQUID FILTER, IN PARTICULAR AN OIL FILTER

CROSS REFERENCE TO RELATED APPLICATIONS

This application claims the benefit under 35 USC 119 of foreign application 10 2009 032 702.9 filed in Germany on Jul. 9, 2009, and which is hereby incorporated by reference in its entirety.

TECHNICAL FIELD

The invention relates to a liquid filter, in particular an oil filter.

BACKGROUND OF THE INVENTION

Fluid filters, in particular oil filters, in which the filter insert is designed to be separated from the filter housing, are used in motor vehicles and industrial motors. The filter has a filter housing that is separable along an interface, wherein two housing components of the filter housing are sealed to one another along an interface by means of a gasket.

SUMMARY OF THE INVENTION

An object of the present invention is to improve a liquid filter, in particular an oil filter, with respect to the prior art. This objective is achieved by a filter having the characteristics of claim 1.

The liquid filter according to the invention has a filter housing with a filter element and a standpipe provided inside a filter element, as well as a sealing element that tightly seals a discharge hole in the filter housing for a filter element inserted into the housing in a simple manner in a first operation, through which the liquid present in the housing during removal of the filter element is able to flow out of the housing. In a second operation the sealing element seals the clean side from the contaminated side between the standpipe and housing. The standpipe is sealed tightly to the filter element.

The liquid filter has a filter housing with a contaminated liquid inlet and a clean liquid outlet, as well as a filter element arranged in the filter housing for cleaning a liquid, formed, for example, from a filter medium that is assembled in a zig-zag manner into a cylinder with end plates arranged frontally, known to practitioners in the field as circular elements. A standpipe is located inside the filter element.

The sealing element for closing the discharge hole in the housing is located in the connection region between standpipe and filter element, so that, the discharge hole is unblocked and the liquid is able to flow out of the housing when the filter element is removed for maintenance during filter exchange. The discharge hole consists of one or a plurality of holes located at a distance from the central axis of the filter element.

When the filter element is installed, the sealing element seals the discharge hole in the filter housing and simultaneously seals it between the clean and contaminated sides of the filter element against the housing.

In a preferred embodiment, the sealing element is located on the front face of the standpipe turned toward the discharge hole. The standpipe preferentially has a receiving area that is enlarged in the radial direction, which accepts the sealing element on the one side and the end plate of the filter element on the axially opposite side.

The contaminated side is radially sealed from the clean side along the circumferential outer wall of the standpipe with respect to the inside of the filter element in a common gasket region between the standpipe and the filter element, in order to prevent leakage along the contact region between the standpipe and filter element. The filter element can be axially displaced over the length of the common sealing point along the standpipe in order to compensate for tolerances.

In an alternative embodiment, the sealing element is arranged on one of the end plates of the filter element facing the discharge hole. The sealing element is attached to the end plate and is exchanged with the filter element during servicing.

The sealing element is advantageously formed as a circumferential flat ring or disk, so that a discharge hole seal is assured irrespective of the angular position of the filter element or the standpipe about the longitudinal axis. Angular positioning of the sealing element is thus unnecessary when the filter element is inserted into the liquid filter, and the filter element can be installed independent of the angular position.

In a preferred embodiment, the sealing element is formed as an elastomer ring punched from tubing. ACM [polyacrylate rubber] is a particularly well suited material for the sealing element.

In a preferred embodiment, the standpipe provided inside the filter element, through which the clean liquid flows, is provided with a dirt cover. This dirt cover can, for example, be a mesh screen, and inhibits the inflow of dirty liquid into the clean liquid outlet when a filter insert is absent.

In a preferred embodiment, the standpipe is delivered, installed, and disassembled as a component of the filter element. In this embodiment, the gasket is arranged on the standpipe, and is thus easy to install.

The standpipe can be inserted into a filter element, connected and/or secured to the filter element during fabrication of the filter element, so that the standpipe is exchanged during the exchange of the filter element without additional manual effort. The sealing element on the standpipe is thus exchanged with it.

The standpipe is preferentially pressed against the housing with a force in the direction of the centerline of the filter element to compress the gasket against the housing to achieve an improved seal between the clean region and contaminated region in the region of contact of the standpipe to the housing, and to assure the secure closure of the discharge hole. This force is preferably applied by a spring, in particular by a coil spring that is mounted on the cover of the filter housing.

In an alternative embodiment, the filter element is pressed axially by a force in the direction of the discharge hole. The spring is supported on a cover of the filter housing. This force causes the gasket held in the end plate of the filter element to be compressed, and thereby makes the seal between the clean region and the contaminated region in the region of contact of the standpipe to the housing. The discharge hole in the housing is covered or closed at the same time.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
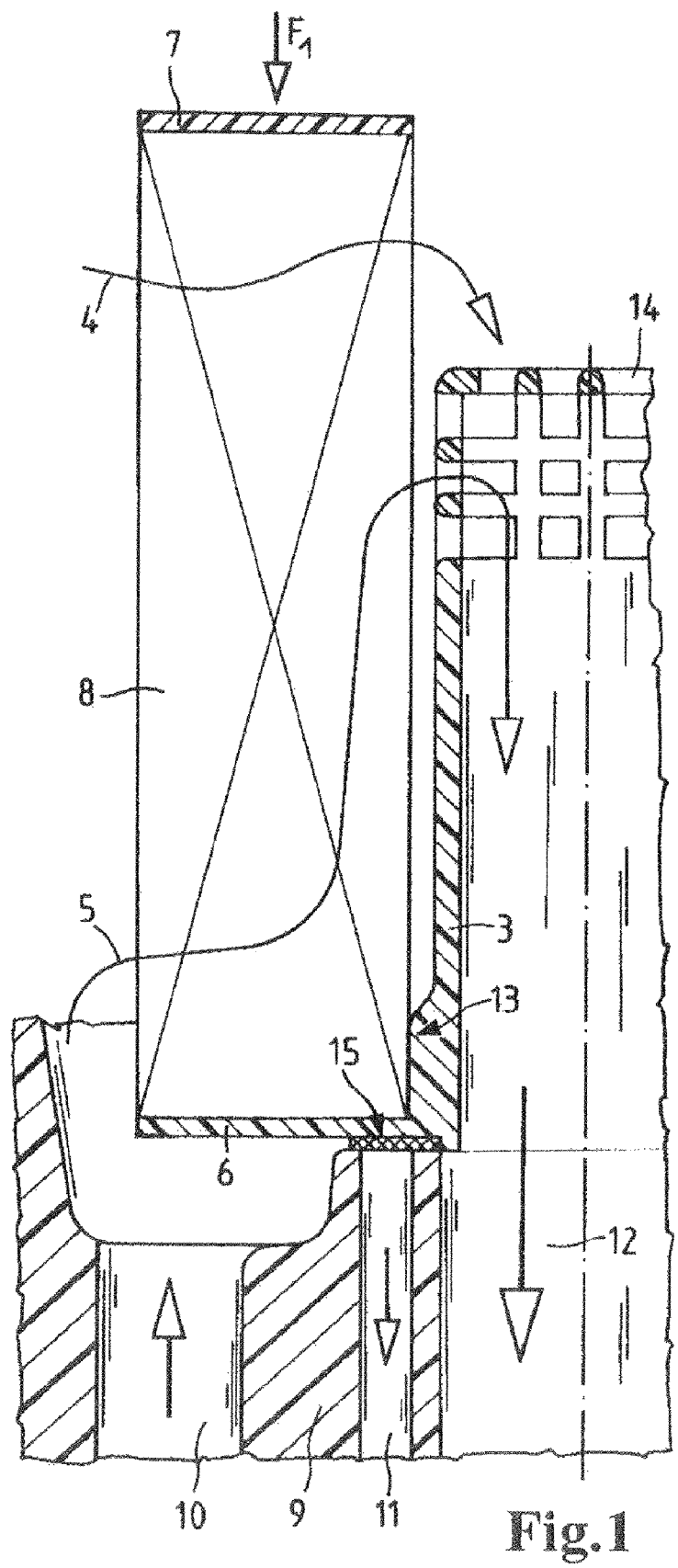
FIG. 1 depicts a schematic sectional view of a filter insert of an oil filter in a housing, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a replaceable filter element arranged on or secured to a standpipe including a sealing element closing a discharge hole in the housing. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 3:
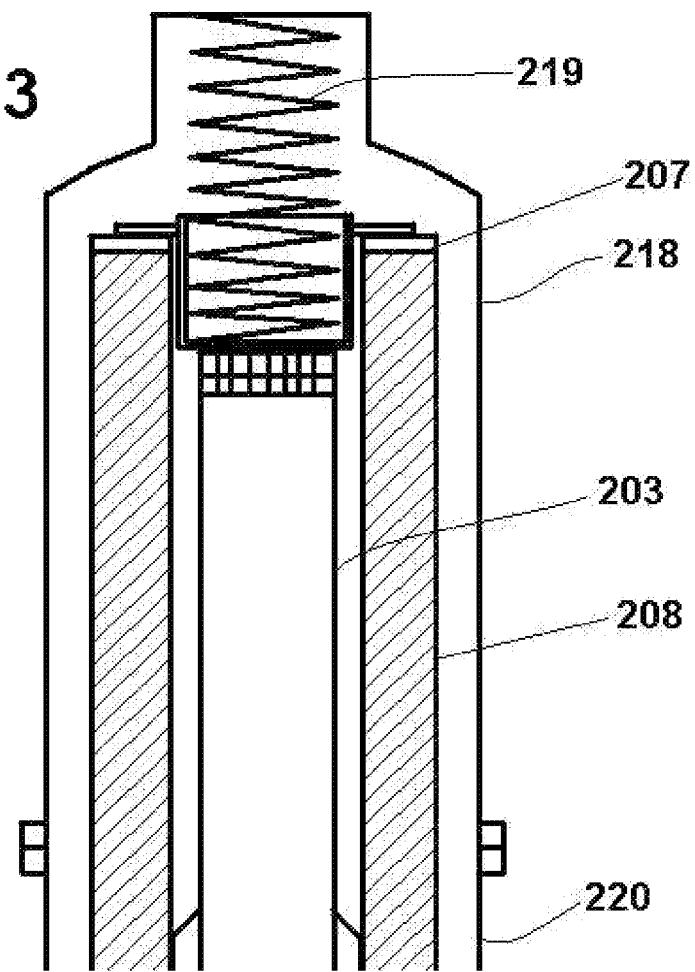
FIG. 3 is schematic sectional view of a filter insert having a standpipe and installed in a housing, illustrating spring loading of the filter insert or stand pipe, consistent with aspects of the present invention.

FIG. 1 shows a schematic view of a housing 9 of an oil filter that has a contaminated oil inlet 10 and a clean oil outlet 12, and is closed with a cover 218 (FIG. 3). A tubular shaped filter element 8 is located inside the housing, which is assembled from a zig-zag shaped folded filter medium, and has facing end plates 6 and 7. The filter element 8 may have a cylindrical shape or any other shape that defines an axially aligned cavity within the filter element 8 into which a standpipe 3 may be received. The contaminated oil flows through the filter element along arrows 4 and 5, is cleaned and deposited in the center of the filter element 8, itself above the clean oil discharge 12.

An additional discharge is provided on the housing 9 in the form of a discharge hole 11, which assures that oil still present during the removal and exchange of filter element 8 can flow out of the housing in a downward direction.

A standpipe 3 is provided inside the filter element 8 through which the clean oil flows, and which is provided with a dirt cover 14. This dirt cover can, for example, also be a mesh screen, and inhibits the inflow of dirty oil into the clean oil outlet when a filter insert is missing.

The filter element 8 is loaded by means of a coil spring, not shown here, with a force F1 from above. This coil spring is supported on the housing 9, specifically on an interior of the cover 218 (FIG. 3). This force produces a seal between the clean oil region and the contaminated oil region in the gasket region 15, and the discharge hole in the housing is covered or closed. This sealing region can be improved by means of an elastomer disk. As long as the standpipe 3 is delivered as a component of the filter element, and is installed and disassembled into the housing together with the filter element, then as the gasket 15 is located on the standpipe 3 it is thus easy to install.

The contaminated side is radially sealed from the clean side along the circumferential outer wall of the standpipe 3 with respect to the inside of the filter element 8 at a sealing point 13 between the standpipe 3 and the filter element 8. The filter element 8 can be axially displaced along the standpipe in order to match tolerances. This sealing point is formed by joining the standpipe in the filter element, for example, by seating the standpipe and/or end plate of the filter element in the region of the sealing point.

In the embodiment shown, the standpipe 3 has an enlarged diameter in the region of the end plate 6 of the filter element 8, so that the lower end plate 6 of the filter element is held by the standpipe 3.

Alternatively, the standpipe 3 can be designed as a unitary or one-piece component of the lower end plate 6, so that the gasket 15 is mounted on the end plate.

As has already been mentioned, the standpipe 3 has a dirt screen or a dirt cover 14. The standpipe shown here can be inserted into a filter element, or connected with the filter element during filter element fabrication, so that the standpipe 3 can be exchanged without additional manual effort when exchanging the filter element.

Figure 2:
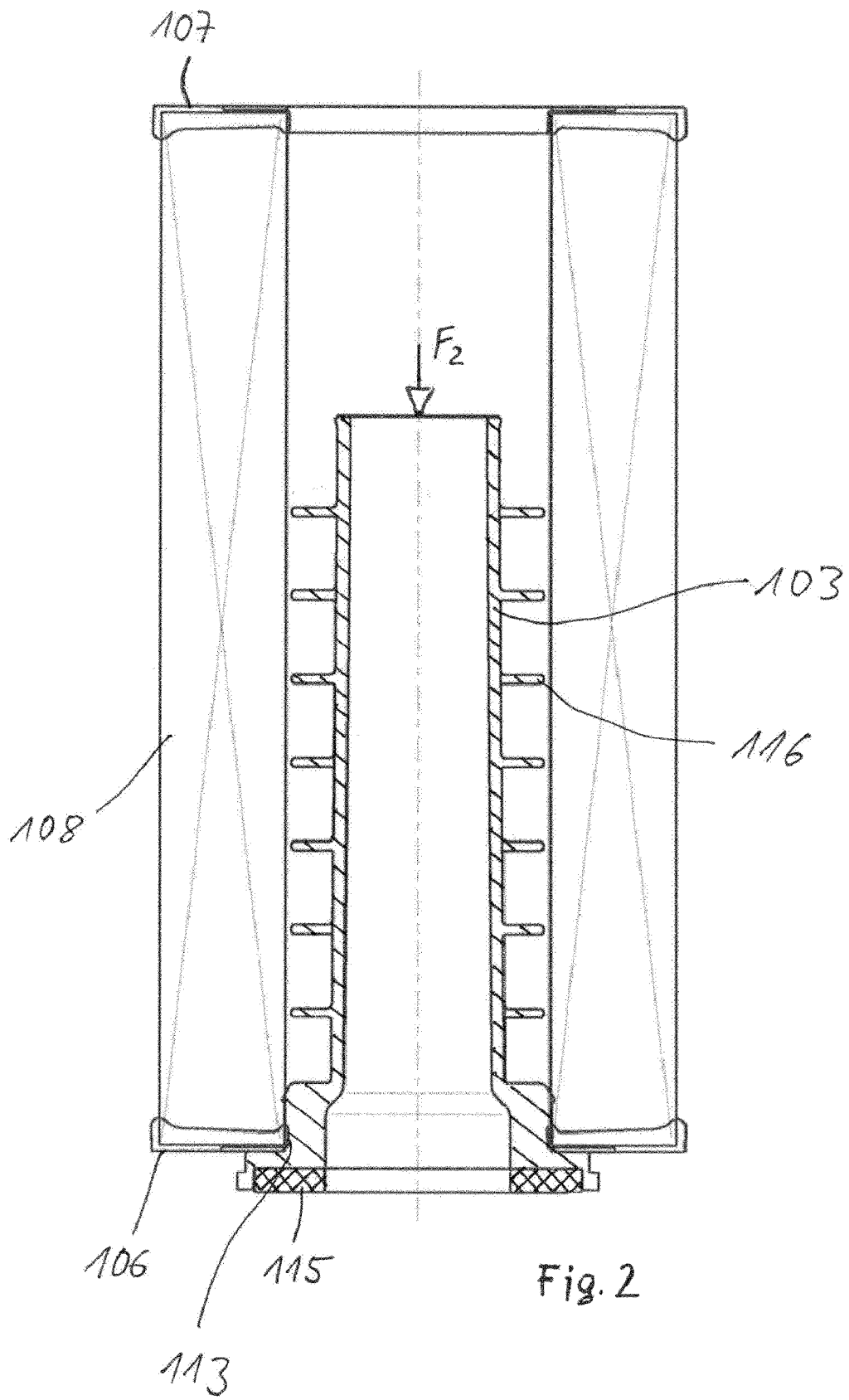
FIG. 2 depicts a schematic sectional view of a filter insert having a standpipe according to an alternate embodiment of the present invention.

FIG. 2 shows a section through a filter element 108 with the end plates 106 and 107, which can be inserted into a housing 9 (not shown in this figure). A standpipe 103 is arranged inside the filter element 108 through which the clean oil flows. The standpipe 103 has spacers 116 oriented radially in the outward direction for guiding and/or strengthening the filter element 108 in the form of ribs, which simultaneously guides the oil discharged from the filter element 108 to flow between the filter element 108 and standpipe 103 and then enter the standpipe 103 to flow downwards to the clean oil outlet (such as clean oil outlet 12 in FIG. 1).

The standpipe 103 is loaded with a force F2 from above, by means of a coil spring 219 (FIG. 3) and pressed against the housing 9. This coil spring is supported on an inside surface of the cover 218 of the housing 9. This force produces a seal between the clean oil region and the contaminated oil region in the region of a sealing element 115.

The discharge hole 11 in the housing 9 is simultaneously covered or closed by the force F2 acting on the sealing element 115. This sealing element can be designed as a gasket in the form of a flat elastomer ring. The sealing element 115 located on the standpipe 103 and is thus easy to install together with the standpipe 103 on the filter.

The standpipe 103 shown can be inserted into a filter element 108 or connected with a filter element 108 during fabrication of the latter, so that the standpipe 3 can be exchanged without additional manual effort when the filter element is exchanged.

FIG. 3 depicts a schematic view of a housing (such as housing 9 of FIG. 1 and FIG. 2) comprising a housing cover 218 and a housing based 220. A replaceable (or exchangeable) cylindrical filter element 208 is replaceably received in the housing 9 (removable cover 218 plus base 220). The filter element 203 is arranged on or in other aspects, mounted or secured to a standpipe 203. The filter element 208 has an upper end cap 207 secured to an end face of the filter media of the filter element. Either one of or both of the filter element end cap 207 or the standpipe 203 are loaded by a spring 219 (loading force shown by F1 in FIG. 1 or F2 in FIG. 2). The spring 219 is supported against the interior of the cover 218 and compressibly loads the filter element 208 and/or standpipe 203 in an axial direction to compress the gasket (15, 115) to sealably close over the discharge hole 11 of the housing 9.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A liquid filter comprising:
a filter housing having a fluid inlet port, a filter fluid outlet port, a discharge hole, said filter housing comprising
a housing base; and
a house cover removable from said housing base;
a tubular filter element having an axially aligned cavity and arranged within the filter housing, said filter element having a clean side and a contaminated side, said filter element comprising
a filter media;
an upper end plate secured to one end face of said media; and
a lower end plate secured to an opposing end face of said media; and
a standpipe arranged in said axially aligned cavity within the filter element,
wherein the standpipe is sealed tightly to the filter element,
a gasket arranged on said standpipe and sealably closing said discharge hole of said housing,
wherein upon removal of said standpipe from said housing, said gasket uncovers said discharge hole draining residual fluid from said housing, and
wherein said gasket seals between said standpipe and filter housing, said gasket sealing said clean side from said contaminated side,
wherein said stand pipe includes
a receiving area that is enlarged outward in a radial direction from said stand pipe, said receiving area including
a first side onto which said gasket is arranged, said gasket facing on said first side facing said discharge hole,
an axially opposing second side onto which said lower end plate is received,
a coil spring supported on a inner surface of said housing cover, said coil spring applying a compressing force onto said stand pipe, pressing the gasket against said housing with an compression force aligned axially with the stand pipe,
wherein said spring applies said pressing force onto said stand pipe and not to said filter element.

2. The liquid filter of claim 1, wherein
said gasket is secured to said lower end plate or said standpipe, said filter element for maintenance purposes.

3. The liquid filter of claim 1, wherein
said gasket is a circumferential ring configured to provide angle-independent positioning during installation of said filter element and/or the standpipe in said housing.

4. The liquid filter of claim 1, wherein
said gasket is an annular elastomer component punched from an elastomer tubing.

5. The liquid filter of claim 4, wherein
said gasket comprises a polyacrylate rubber (ACM).

6. The liquid filter of claim 1, wherein
said filter element mounted on said stand pipe forms a seal is between said standpipe and said filter element on a sealing point where said standpipe is mounted to and contacts said filter element.

7. The liquid filter of claim 1, wherein
said filter medium is folded in a zig-zag manner into a cylinder.

8. The liquid filter of claim 2, wherein
said standpipe and said filter element are secured together and exchangeable from said housing as a unit,
wherein said gasket is a circumferential ring configured to provide angle-independent positioning during installation of said filter element and/or the standpipe in said housing,
wherein said gasket is annular elastomer component,
wherein said filter element mounted on said stand pipe forms a seal is between said standpipe and said filter element on a sealing point where said standpipe is mounted to and contacts said filter element,
wherein said filter medium is folded in a zig-zag manner into a cylinder.

9. The liquid filter of claim 1, wherein
said stand pipe receiving area is arranged between and axially spaces apart said gasket and said lower end plate.

10. The liquid filter of claim 8, wherein
said stand pipe receiving area is arranged between and axially spaces apart said gasket and said lower end plate.

* * * * *